United States Patent [19]
Krauter et al.

[11] Patent Number: 6,007,255
[45] Date of Patent: Dec. 28, 1999

[54] ADAPTER ASSEMBLY FOR LIGHT SOURCE

[75] Inventors: Allan I. Krauter, Syracuse; Joseph A. Ciarlei, Marcellus, both of N.Y.

[73] Assignee: Welch Allyn, Inc., Skaneateles Falls, N.Y.

[21] Appl. No.: 09/129,834

[22] Filed: Aug. 5, 1998

[51] Int. Cl.$^6$ ....................................................... G02B 6/36
[52] U.S. Cl. ............................... 385/53; 385/54; 385/34; 385/88; 385/135; 362/584
[58] Field of Search .................. 385/53, 54, 55, 385/74, 79, 33, 34, 88–94, 135; 362/584

[56] References Cited

U.S. PATENT DOCUMENTS

| | | |
|---|---|---|
| 3,831,017 | 8/1974 | Auer . |
| 4,025,776 | 5/1977 | Cawood et al. . |
| 4,232,934 | 11/1980 | Feinbloom . |
| 4,356,534 | 10/1982 | Hattori . |
| 4,397,523 | 8/1983 | Feinbloom et al. . |
| 4,744,615 | 5/1988 | Fan et al. . |
| 4,773,723 | 9/1988 | Cuda . |
| 5,271,079 | 12/1993 | Levinson . |
| 5,395,362 | 3/1995 | Sacharoff et al. . |
| 5,512,291 | 4/1996 | Buchin et al. . |
| 5,594,826 | 1/1997 | Wood et al. . |
| 5,617,302 | 4/1997 | Kloots . |
| 5,882,102 | 3/1999 | Pileski ...................................... 362/584 |

Primary Examiner—Phan T. H. Palmer
Attorney, Agent, or Firm—Wall Marjama Bilinski & Burr

[57] ABSTRACT

Apparatus for use with a light box having a high output light source contained within a housing includes a rotatable turret assembly capable of supporting a corresponding number of optical fiber bundles. The turret assembly is eccentrically mounted relative to an illumination axis of the contained light source. A glass rod is fixedly disposed at substantially the focal point of an exiting beam of the light source along the illumination axis, allowing each of the supported fiber bundles to be selectively rotated into and out of alignment to provide efficient light coupling while preventing premature degradation of the optical fibers while electrically isolating the turret assembly.

22 Claims, 4 Drawing Sheets

ADAPTER ASSEMBLY FOR LIGHT SOURCE

FIELD OF THE INVENTION

This invention relates to light boxes for illuminating fiber optic light bundles, and is directed more particularly to a light box including a rotatable turret assembly in which one of a plurality of fiber optic bundles can be selectively indexed into coupling arrangement with a high output light source using an intermediately disposed glass rod.

BACKGROUND OF THE INVENTION

Because of their effectiveness and ease of use, fiberoptic illumination systems have become widely used in medical examination devices such as otoscopes, skin surface microscopes, and the like. The fiberoptic light bundles used in such systems are able to provide bright illumination over considerable distances because light is transmitted through the fiber bundles using the highly efficient process of internal reflection. Such fiberoptic light bundles also have a flexibility which makes them easy to manipulate and steer, properties which are particularly important in instruments such as endoscopes which are used inside a patient's body.

Because of the wide variety of applications in which fiberoptic light bundles are used, they are made in a wide range of sizes such as, for example, 2.5 to 12.5 mm. In addition to being made in different sizes, fiberoptic light bundles are manufactured with a variety of different types of fiberoptic connectors.

Existing adapters allow light boxes to be used with different sizes and types of fiber optic connectors. One type of such adapter, referred to as "universal" adapters (sometimes referred to as nose adapters), such as those described in U.S. Pat. No. 4,232,934 (Feinbloom), U.S. Pat. No. 4,497,523 (Feinbloom) and U.S. Pat. No. 5,594,826 (Wood et al). include a housing attached to the front panel of the light box and includes an opening which allows a single male fiber optic connector to be inserted and removed. The adapter opening can be adjusted to allow fiber light bundles of different sizes to be connected to the contained light source.

Another type of light box adapter is a rotatable turret assembly having a plurality of female connectors of different sizes, such as described in U.S. Pat. No. 3,831,017 (Auer) and U.S. Pat. No. 4,773,723 (Cuda), among others. Being rotatable, the turret assembly allows a specific fiber light bundle to be coupled to a female connector and selectively indexed into alignment with the contained light source.

A constraint using either adapter is that some light sources have a light output which is sufficient to degrade conventional fiber bundles. To that end, there is a general desire to be able to couple illumination fiber bundles to a high output light box without degradation of the coupled fiber bundles.

SUMMARY OF THE INVENTION

A primary object of the present invention is to improve the state of the art of light boxes having contained illumination sources.

It is another primary object of the present invention to be able to couple a plurality of illumination fiber bundles to a high output light source without degradation of the proximal ends of the bundles.

It is another primary object of the present invention to provide a turret assembly which allows selective coupling of a plurality of light bundles with a contained light source and which is electrically isolated from the light box.

Therefore, and according to a preferred aspect of the present invention, there is a described apparatus for coupling a plurality of fiber optic illumination bundles to a light box, said light box comprising a housing having a contained light source, said housing including at least one aperture for allowing light from said light source to be directed away from said light source along an illumination axis, said apparatus including:

a glass rod fixedly attached through said at least one aperture and aligned with said contained light source, said glass rod having one end disposed at substantially the effective focal point of the light source;

a rotatable turret assembly having a rotatable support member including means for supporting said plurality of optical fiber bundles; and means for selectively aligning each optical fiber bundle supported by said turret assembly with said glass rod.

Preferably, the glass rod is positioned at or substantially adjacent to the focal point of the contained light source and the rotatable plate is eccentrically mounted relative to the illumination axis so as to allow each of the attached fiber bundles to be rotated into and out of alignment with the illumination axis.

A feature of the present invention is that the glass rod is retained such that there is no light obstruction at either end. According to a preferred technique, the rod is inserted into a cylindrical mount and retained using a hollow elastomeric tube or sleeve attached at one end of said mount.

According to another preferred aspect of the present invention, there is described a light box comprising:

a housing;

a high output light source contained within said housing, said housing including at least one aperture for allowing light from said light source to be directed away from said light source along an illumination axis;

a cylindrical glass rod fixedly attached through said aperture and aligned with said illumination axis, said glass rod having one end disposed at substantially the effective focal point of the light source;

a rotatable turret assembly attached to the exterior of said housing, said rotatable turret assembly including a rotatable support member having means for supporting at least one optical fiber bundle; and means for selectively aligning each supported optical fiber bundle with said illumination axis and in coupling relation with said glass rod.

An advantage of the present invention is that the described assembly can be conveniently used with many existing light boxes, or requiring only minimum modification thereto.

Another advantage of the present invention is that any of several bundle designs can be effectively coupled and connected to the same contained light source without degradation to the fibers of the illumination bundles.

Another advantage of the present invention is that a single glass rod can be used in conjunction with a plurality of fiber bundles, thereby minimizing manufacturing costs associated with the light box.

These and other features, objects, and advantages will be described in accordance with the following Detailed Description of the Invention which should be read in conjunction with the accompanying drawings.

DETAILED DESCRIPTION OF THE INVENTION

The following discussion relates to a preferred embodiment of apparatus according to a preferred embodiment of the present invention as used in conjunction with a specific light box. It will be readily apparent from the discussion which follows, however, that the concepts described herein are applicable to other suitable light sources and applications. In addition, and throughout the course of discussion, several terms are used, such as "front", "rear", "side", "lateral", "upper" and "lower" and the like, to provide a frame of reference in conjunction with the accompanying drawings. These terms should not be construed as limiting upon the concepts which are taught and claimed herein.

Figure 1:
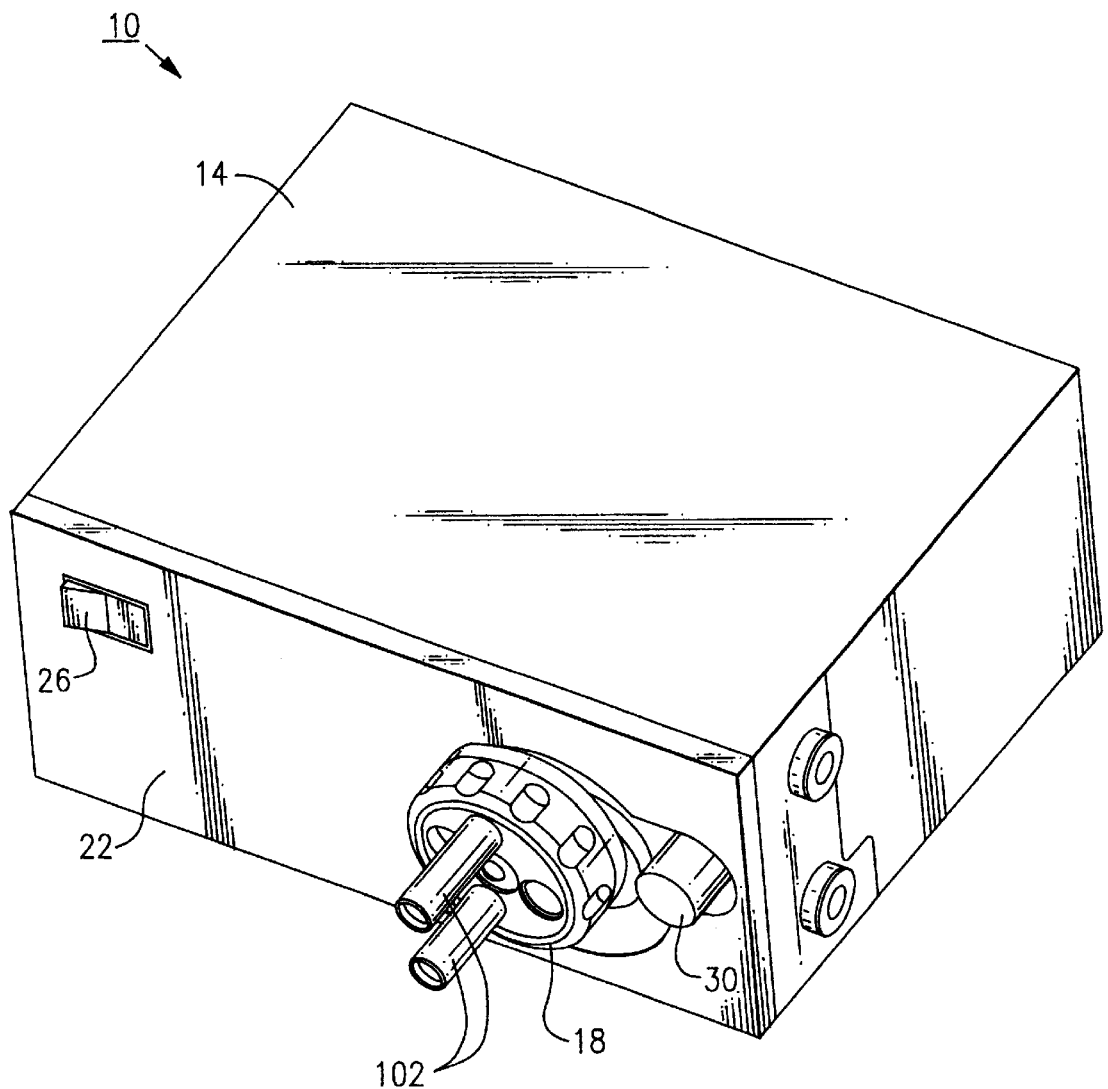
FIG. 1 is a top perspective view of a light box having apparatus in accordance with the present invention.

Therefore, and referring to FIG. 1, there is shown a light box 10 including a housing 14, including a front facing side 22 onto which the assembly 18 of the present invention is attached. An ON/OFF switch 26 is provided for powering a contained light source and a set of associated cooling fans (not shown) and a light attenuation knob 30 controls the position of a contained attenuation light vane (not shown), the switch and knob also being provided on the front facing side 22 of the housing 14.

Figure 6:
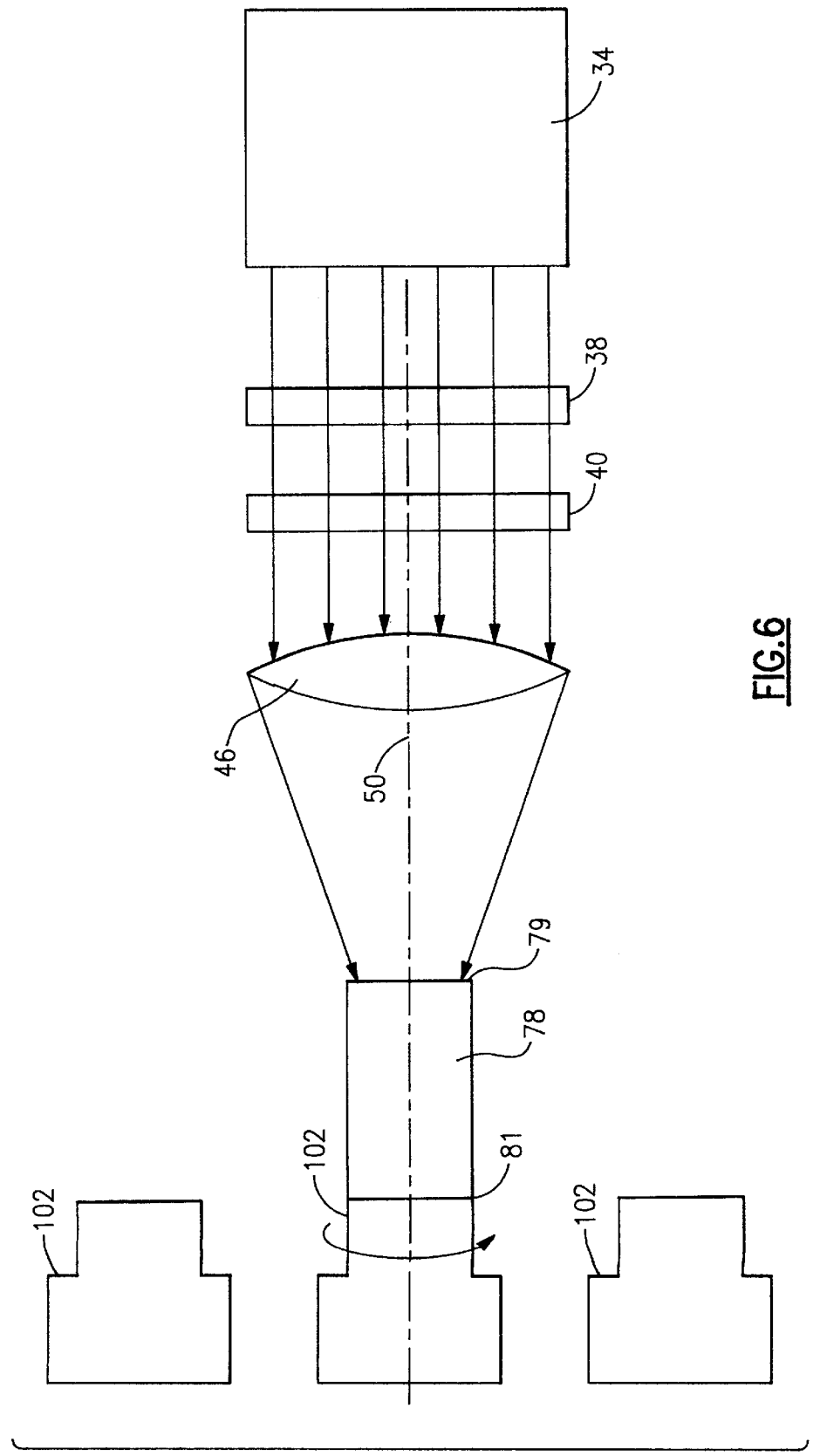
FIG. 6 is a schematic diagram illustrating the alignment of the light source and light coupling portion of the apparatus with the fiber optic connectors as supported by the rotatable turret assembly shown in FIG. 5.

Referring briefly to FIGS. 1 and 6, a high output light source 34 is contained within the interior of the housing 14. According to the present embodiment, the light source 34 is a 300 watt xenon arc lamp that includes a suitably shaped reflector and that produces a substantially collimated beam of light. A pair of dichroic filters 38, 40 provided in front of the light source 34 remove certain wavelengths (preferably non-visible wavelengths such as IR and UV), and a condenser lens 46 is used to focus the collimated light beam. Each of the above elements are disposed along an illumination axis 50. Details relating to the operation of each of the features 26, 30, 34, 38, 40 and 46 of the above illumination system are acknowledged to be well known in the field and require no further discussion, except to amplify description of the present invention as needed.

Figure 2:
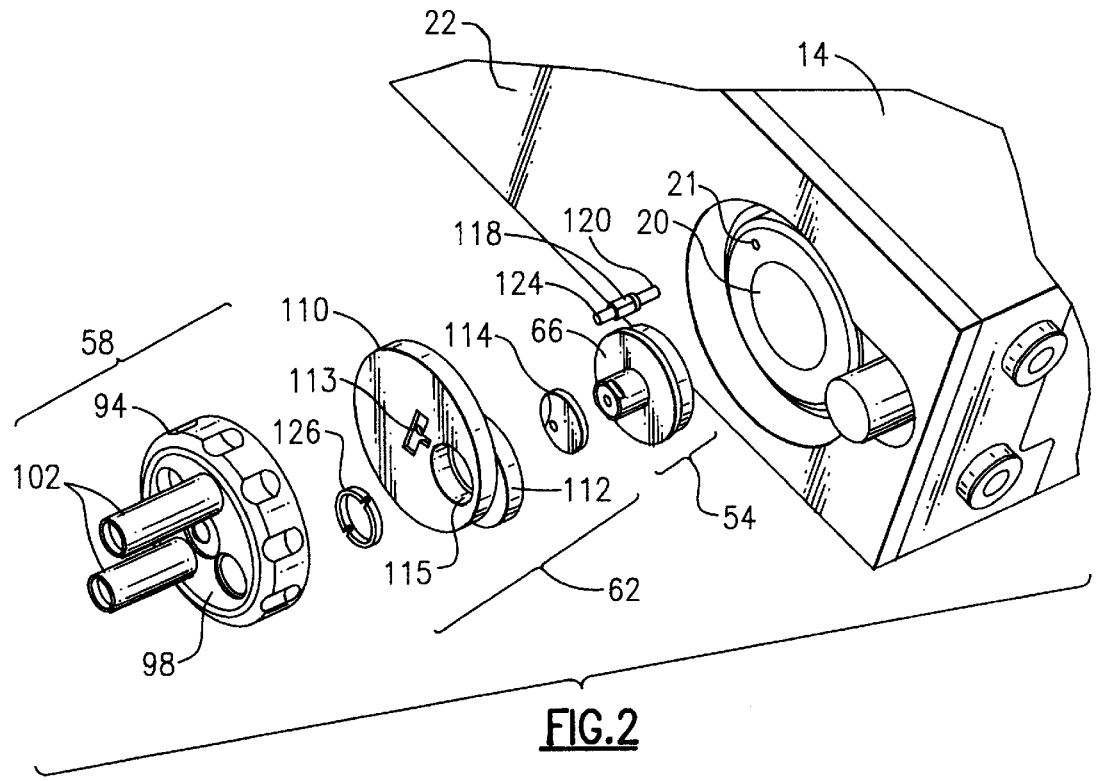
FIG. 2 is an partial exploded view of the apparatus of FIG. 1.

For purposes of the following discussion, and referring to FIG. 2, the overall assembly 18 includes three major subassemblies, a rotatable turret subassembly 58, a light coupling subassembly 54, and an adapter subassembly 62 which is used to interconnect the turret and light coupling subassemblies.

Figure 3:
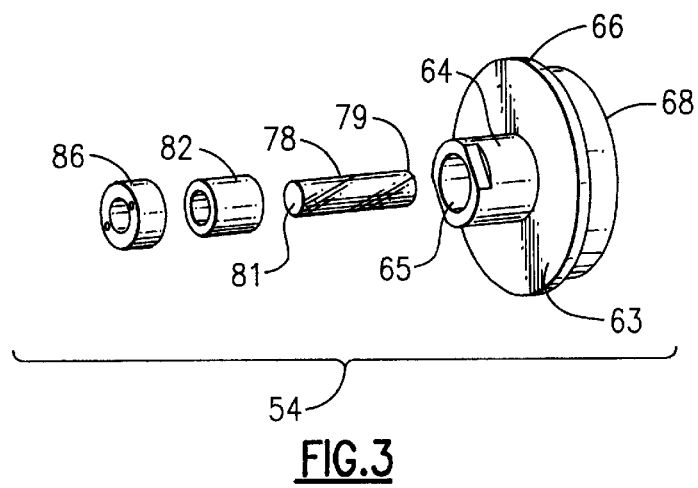
FIG. 3 is an exploded view of the light coupling portion of the apparatus shown in FIG. 2.

Referring to the exploded view of FIG. 3, the light coupling subassembly 54 is herein described. A mount 66 includes a threaded engagement portion 68 extending rearwardly from a disc-shaped body portion 63 for attachment with a correspondingly sized threaded opening 20 of the light box 10, and an oppositely disposed externally cylindrical extending portion 64. A center through aperture 65 of the mount 66 is aligned with the light box access opening 20, each of the openings being further aligned with the illumination axis 50, FIG. 6. According to the present embodiment, the mount 66 is made from a conductive material, such as aluminum, though stainless steel or other suitable materials can be substituted.

A cylindrical glass rod 78 is sized to fit within the center aperture 65, and is positioned such that a proximal end 79, FIG. 6, is located substantially at the focal point of the light beam as focused by the condenser lens 46, FIG. 6. The glass rod 78 is held in the mount 66 via a hollow elastomeric tube 82 which is compressed radially onto the exterior of the rod when a retainer ring 86 compresses the elastomeric tube axially against an internal shoulder (not shown) provided in the center aperture 65 of the mount. The retainer ring 86 preferably has a countersink (not shown), into which a square end of the abutting elastomeric tube 82 can deform, thereby providing compliance when the retainer ring is tightened. According to the present embodiment, the elastomeric tube is made from silicone, though it will be apparent that other suitable compressible materials can be utilized.

Figure 5:
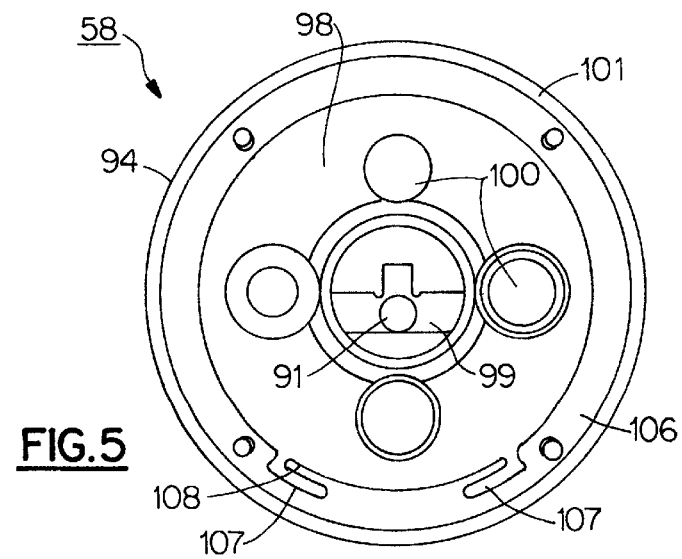
FIG. 5 is a partial rear view of the turret portion of the apparatus of FIGS. 2–4.

Referring to FIGS. 2 and 5, the turret subassembly 58 includes a turret supporting member or disk 98 including a plurality of mounting apertures 100 sized for retaining a corresponding number of fiber optic connectors 102, FIGS. 1 and 2. The connectors 102 extend from an outward facing side of the subassembly 58, each connector being capable of supporting a corresponding fiber optic bundle (not shown). According to the present embodiment, four (4) mounting apertures 100 are circumferentially disposed about a center mounting post 99, though only two connectors 102 are actually depicted in either of FIGS. 1 and 2. As is readily apparent, the number of mounting apertures 100 can easily be varied, depending on the size of the connectors.

Figure 4:
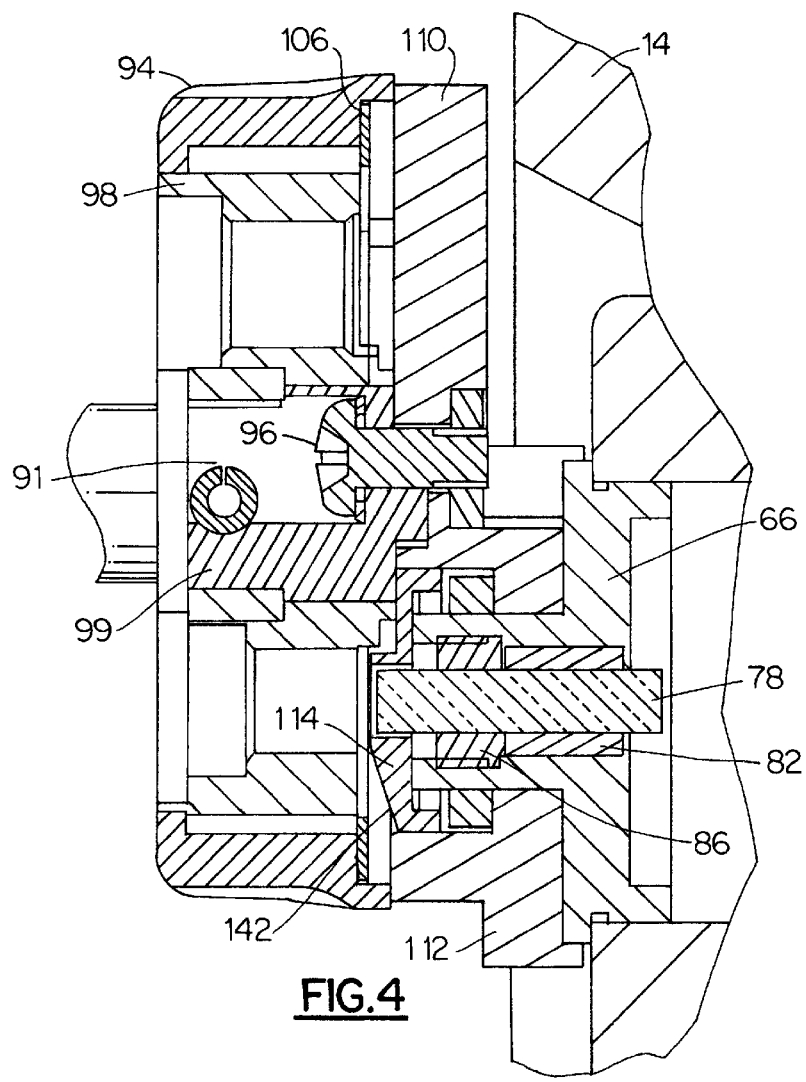
FIG. 4 is an assembled partial sectional view of the apparatus of FIGS. 2 and 3.

A thin locking ring 106, FIG. 4, made from stainless steel or other suitable material, is securely fixed to the interior side 101 of the rotatable turret ring 94, whose interior cavity is sized for retaining the turret supporting member 98. According to the present embodiment, the locking ring 106 is ultrasonically staked or otherwise fixedly attached to the interior side 101 of the rotatable turret ring 94 with the turret supporting member 98 being situated therebetween. Thereafter, and according to this embodiment a pair of tabs 108 provided on the locking ring 106 are bent into a circumferential recess 107 in the back of the supporting member 98 to prevent rotation of the turret supporting member 98 relative to the locking ring/disk assembly and to interconnect the rotatable ring 94 and the supporting member 98 together.

As noted above, each of the mounting apertures 100 of the turret supporting member 98 include means for retaining a fiber optic connector 102. Typically, the connectors 102 each include an open-ended cylindrical housing having a hollow interior for retaining a fiber optic bundle (not shown). The turret supporting member 98 and connectors 102 according to the present embodiment are each made from aluminum or other similar material in which the circumferentially spaced mounting apertures 100 are designed to allow fitting of different types and sizes of fiber optic connectors to a desired axial position with respect to the light coupling subassembly 54. One exemplary turret assembly design which utilizes spring-loaded ball detent members (not shown) in at least a portion of the mounting apertures for engaging a circumferential groove (not shown) provided on the exterior end portions of some of the fiberoptic ferrules is described in commonly assigned U.S. patent application Ser. No. 08/781, 640, filed Jan. 10,1997 now U.S. Pat. No. 5,882,102 in the name of Pileski [Attorney Docket 286_064], the entire contents of which are herein incorporated by reference. The supporting member of this design also includes mounting apertures with threaded openings for accommodating connectors which can be directly threaded thereupon. The mounting post 99 is made from a non electrically conductive material and includes a recess 97 extending to a mounting opening 91.

Referring to FIGS. 2 and 4, the adapter subassembly 62 according to the present embodiment comprises a number of components, including an eccentric or offset disk 110, a locking nut 126, and a protective cap 114 which are used in conjunction with the mount 66 of the light coupling subassembly 54 and the completed turret subassembly 58.

The offset disk 110 is used to effectively link the turret subassembly 58 with the light coupling subassembly 54 and includes a rear engagement portion 112 which is used to attach to the mount 66. The offset disk 110 includes a center opening 113 in which the rear engagement portion 112 and an associated through opening 115 are eccentrically located in relation thereto. According to another aspect of the present embodiment, the offset disk 110 and the protective cap 114 are also preferably made from a non-conductive material, such as plastic, which enables electrical isolation to be achieved between the grounded mount 66 and the turret subassembly 58.

The locking nut 126 is threaded onto the external extending portion 64 of the assembled mount 66, as fitted through the opening 115, thereby holding the offset disk 110 in position. The offset disk 110 is prevented from rotating about the mount 66 by a locating pin 118 which is fastened into an opening or hole 21 provided in the front facing side 22 of the light box housing 14. According to this embodiment, the locating pin 118 includes a cylindrical end 124 sized for fitting a mating hole (not shown) provided in the rear side of the offset disk 110 and a threaded end 120 for engaging the hole 21 provided in the light box housing 14.

The protective cap 114 is attached to the mount 66 after the offset disk 110 has been attached thereto using the locking nut 126. The cap 114 serves two primary functions: First, the cap 114, being made from a non electrically conductive material, provides a highpot barrier between the electrically floating fiber connectors 102 and the grounded mount 66, each of which, as noted above are typically conductive. Second, the cap 114 preferably includes a conical facing surface 142 which protects the distal end 81 of the cylindrical glass rod 78 from being struck by the rotating ferrules (not shown), as retained by the connectors 102. Such protection against striking is especially important in the event long fiber ferrules are inserted into the turret subassembly 58. The conical facing surface 142 of the threaded cap 114 guides the ferrule axially away from the glass rod 78, preventing ferrule-rod contact.

Referring to the Figures in general, the assembly sequence of the presently described assembly 18 to the light box 10 is as follows:

First, the existing screw (not shown) typically provided in the front facing side 22 of the light box housing 14 is removed and is replaced with the locating pin 118, as described above, with the threaded end 120 being engaged with the light box housing hole 21. The cylindrical glass rod 78, the silicone tube 82, and the retaining screw 86 are each preassembled into the mount 66 in the manner previously described above and the mount is then attached to the front facing side 22 of the housing 14 by threading the rear portion 68 thereof into the access opening 20. As noted above, the attachment of the light coupling subassembly 54 prelocates the proximal end 79 of the cylindrical glass rod 78 at substantially the focal point of the contained light source 34, FIG. 6. The rear engagement portion 112 of the offset disk 110 is then aligned with the light coupling subassembly 54 and is attached to the mount 66 using the locking nut 126. As previously noted, the cylindrical end 124 of the locking pin 118 is inserted into a mating hole formed in the rear of the offset disk 110 to prevent rotation. The protective cap 114 is then attached onto the assembly formed by the light coupling subassembly 54 and the adapter subassembly 62. Finally, the turret subassembly 58, including the preassembled rotatable ring 94, locking ring 106, and turret supporting member 98, is attached to the offset disk 110 using the mounting screw 96 which is attached through the recessed cavity 97 and mounting opening 91 provided in the mounting post 99 in order to form the completed assembly 18.

In operation, a number of different sizes and types of fiber optic connectors can be assembled to the turret supporting member 98 in a known manner. The rotatable turret ring 94 allows the connectors 102 containing the optical ferrules (not shown) to be rotated and indexed so as to align each of the connectors 102 with the illumination axis 50 of the light box 10 and more particularly with the light coupling subassembly 54 as shown in FIGS. 2, 3 and 6. Details relating to the specific indexing aspects of the apparatus are provided in previously incorporated U.S. Ser. No. 08/781,640. In the meantime, sufficient electrical isolation is achieved between the grounded mount 66 and the turret subassembly 58 due to the presence of the non-conductive offset disk 110, the protective cap 114, as well as the mounting post 99.

It should be noted that the described mounting post 99 can alternately be used in other turret assemblies, such as those previously described in the Background Section and especially the previously incorporated Ser. No. 08/781,640 patent. The recessed cavity 97 covers the mounting screw 96 and therefore provides clearance between the head of the mounting screw and the user. Considering that voltages as high as 4000 volts can be generated by the light box 10, ensuring adequate isolation is essential.

Parts List for FIGS. 1–6

10 light box
14 housing
18 assembly
20 opening
21 hole
22 front facing side
26 ON/OFF switch
30 light attenuation knob
34 light source
38 dichroic filter
40 dichroic filter
46 condenser lens
50 illumination axis
54 light coupling subassembly
58 turret subassembly
62 adapter subassembly
63 body portion (mount)
64 extending portion
65 access opening
66 mount
68 threaded engagement portion
76 engagement portion
78 cylindrical glass rod 79 proximal end
81 distal end
82 elastomeric tube
86 retaining ring
91 opening
94 rotatable ring
96 mounting screw
97 recessed cavity
98 supporting member
99 center mounting post
100 mounting apertures
101 interior side
102 fiber optic connectors
106 locking ring
107 circumferential recess
108 tabs
110 offset disk
112 rear engagement portion
113 opening
114 protective cap
115 opening
118 locking pin
120 threaded end
124 cylindrical end
126 locking nut
142 conical facing surface Although the present invention has been described in terms of certain embodiments, it will be readily apparent that modifications and variations will become apparent to one of sufficient skill in the field which contain the inventive concepts of the invention according to the following appended claims:

We claim:

1. Apparatus for coupling a plurality of fiber optic illumination bundles to a light box, said light box comprising a housing having a contained light source, said housing including at least one access opening for allowing light from said light source to be directed away from said light source along an illumination axis, said apparatus including:
    a glass rod fixedly attached through said at least one aperture and aligned with said contained light source, said glass rod having one end disposed at substantially the effective focal point of the light source;
    a rotatable turret assembly having a rotatable support member including means for supporting said plurality of optical fiber bundles; and
    means for selectively aligning each optical fiber bundle supported by said turret assembly with said glass rod.

2. Apparatus as recited in claim 1, wherein said glass rod is retained within a sleeve member attached to said housing.

3. Apparatus as recited in claim 2, including an elastomeric tube sized to fit within said sleeve member and over at least a portion of said glass rod.

4. Apparatus as recited in claim 3, including a retainer having means which are engageable with said one end of said elastomeric tube.

5. Apparatus as recited in claim 3, wherein said elastomeric tube is silicone.

6. Apparatus as recited in claim 2, including a cap member covering an extending portion of said glass rod.

7. Apparatus as recited in claim 6, wherein said cap member includes a conical facing surface for shielding said glass rod from rotating portions of said turret assembly.

8. Apparatus as recited in claim 1, wherein said plurality of optical fiber ports are circumferentially mounted to said rotatable support member and in which the center of said ring is eccentrically mounted relative to said illumination axis.

9. Apparatus as recited in claim 8, wherein said light box includes means for electrically powering said contained light source, said apparatus including means for electrically isolating said turret assembly from said electrical powering means.

10. Apparatus as recited in claim 9, including an offset member interconnecting said rotatable turret assembly with said glass rod, said offset member being made from an electrically non-conductive material.

11. Apparatus as recited in claim 10, including a cap member covering an extending portion of said glass rod, and in which said cap member is made from an electrically non-conductive material.

12. Apparatus as recited in claim 1, wherein said turret assembly includes a rotatable ring member and a locking ring for interconnecting said rotatable ring member onto said rotatable support member.

13. Apparatus as recited in claim 12, wherein said turret assembly includes means for preventing relative rotation between said rotatable ring member and said rotatable support member.

14. Apparatus as recited in claim 13, wherein said rotation preventing means includes at least two tabs provided in said locking ring for engaging circumferential channels provided on one facing side of said support member and in which said locking member is fixedly attached to said rotatable ring member.

15. Apparatus as recited in claim 1, wherein said rotatable support member includes a center opening having a disposed mounting post, said mounting post being made from an electrically non-conductive material and having a defined recessed cavity sized for retaining the head of a mounting screw used for mounting said rotatable turret assembly to said light box so as to provide electrical isolation therebetween.

16. A light box comprising:
    a housing;
    a high output light source contained within said housing, said housing including at least one aperture for allowing light from said light source to be directed away from said light source along an illumination axis;
    a cylindrical glass rod fixedly attached through said aperture and aligned with said contained light source, said glass rod having one end disposed at substantially the effective focal point of the light source;
    a rotatable turret assembly attached to the exterior of said housing, said rotatable turret assembly including a rotatable support member having means for supporting at least one optical fiber bundle; and
    means for selectively aligning each supported optical fiber bundle with said illumination axis and in coupling relation with said glass rod.

17. Apparatus for coupling a plurality of fiber optic illumination bundles to a light box, said light box comprising a housing having a contained light source, said housing including at least one access opening for allowing light from said light source to be directed away from said light source along an illumination axis, said apparatus including:
    a glass rod fixedly attached through said at least one aperture and aligned with said contained light source, said glass rod having one end disposed at substantially the effective focal point of the light source;
    a rotatable turret assembly having a rotatable support member including means for supporting said plurality of optical fiber bundles; and
    wherein said light box includes means for electrically powering said contained light source, said apparatus including means for electrically isolating said turret assembly from said electrical powering means.

18. Apparatus as recited in claim 17, wherein said means for electrical isolation includes an offset member interconnecting said rotatable turret assembly with said glass rod, said offset member being made from an electrically non-conductive material.

19. Apparatus as recited in claim 18, wherein said means for electrical isolation includes a cap member covering an extending portion of said glass rod, and in which said cap member is made from an electrically non-conductive material.

20. Apparatus as recited in claim 19, wherein said cap member includes a conical facing surface for shielding said glass rod from rotating portions of said turret assembly.

21. Apparatus as recited in claim 17, wherein said glass rod is retained within a sleeve member attached to said housing, said apparatus further including an elastomeric tube sized to fit within said sleeve member and over at least a portion of said glass rod.

22. Apparatus as recited in claim 21, including a retainer having means engageable with one end of said elastromeric tube.

* * * * *